United States Patent
Werz et al.

[11] 3,879,115
[45] Apr. 22, 1975

[54] MOTION PICTURE CAMERA WITH MECHANISM FOR MAKING EXPOSURES WITH LAP DISSOLVE

[75] Inventors: Siegfried Werz, Munich; Johann Zanner, Jr., Unterhaching, both of Germany

[73] Assignee: Agfa-Gevaert Aktiengesellschaft, Leverkusen, Germany

[22] Filed: Feb. 16, 1973

[21] Appl. No.: 333,147

[30] Foreign Application Priority Data
Feb. 23, 1972 Germany.......................... 2208405

[52] U.S. Cl.............................. 352/91 S; 352/91 C
[51] Int. Cl.............................................. G03b 21/36
[58] Field of Search...................... 352/91 C, 91 S

[56] References Cited
UNITED STATES PATENTS

| | | |
|---|---|---|
| 3,549,249 | 12/1970 | Katsuyama............................ 352/91 |
| 3,644,025 | 2/1972 | Katsuyama............................ 352/91 |
| 3,690,748 | 9/1972 | Roth....................................... 352/91 |
| 3,748,029 | 7/1973 | Sakaguchi et al. ................ 352/91 S |
| 3,791,724 | 2/1974 | Hirata................................ 352/91 S |

*Primary Examiner*—Samuel S. Matthews
*Assistant Examiner*—Russell E. Adams, Jr.
*Attorney, Agent, or Firm*—Michael S. Striker

[57] ABSTRACT

A motion picture camera wherein the user can override certain stages of automatic operation of the lap dissolve mechanism so as to avoid the making of exposures with fade-out effect prior to the making of exposures with fade-in effect or to avoid the making of exposures with fade-in effect after the completion of exposures with fade-out effect.

5 Claims, 1 Drawing Figure

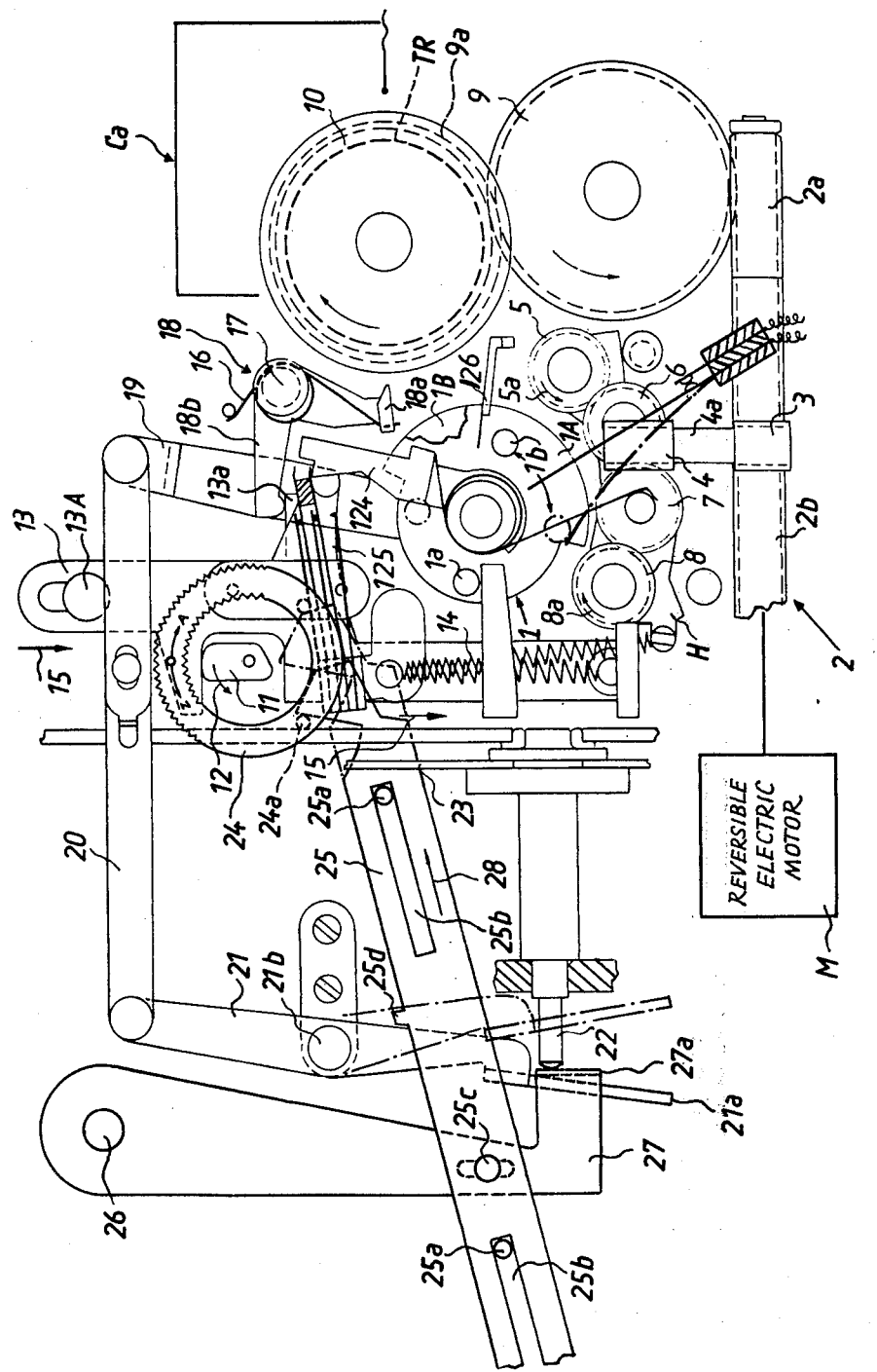

MOTION PICTURE CAMERA WITH MECHANISM FOR MAKING EXPOSURES WITH LAP DISSOLVE

CROSS-REFERENCE TO RELATED APPLICATIONS

The lap dissolve mechanism of the present invention constitutes an improvement over and a further development of the mechanism which is disclosed in our commonly owned copending application Ser. No. 291,390 filed Sept. 22, 1972 and entitled "Motion picture camera with fading means," and of the mechanism disclosed in our commonly owned copending application Ser. No. 291,391 filed Sept. 22, 1972 and entitled "Method and apparatus for regulating the recordal of sound during the making of exposures with fade-out and fade-in effect."

BACKGROUND OF THE INVENTION

The present invention relates to improvements in motion picture cameras, and more particularly to improvements in motion picture cameras which embody mechanisms for the making of exposures with lap dissolve. Still more particularly, the invention relates to improvements in motion picture cameras which embody automatic lap dissolve mechanisms capable of exposing a selected number of film frames with fade-out effect, of thereupon transporting rearwardly the film frames which were exposed with fade-out effect, and of exposing the once-exposed film frames for a second time but with fade-in effect.

It is already known to provide a motion picture camera with a lap dissolve mechanism which enables the user to make a number of so-called trick shots, including exposures with fade-out effect, exposures with fade-in effect, or exposures with fade-out and thereupon with fade-in effect so that the end of a preceding filmed scene appears to merge into the first part of the next following filmed scene. This does not exhaust the number of possible variations and/or combinations of trick exposures, especially in cameras wherein the operation of the lap dissolve mechanism is automatic so that the film frames which were exposed with fade-out effect must be exposed for the second time and that each second exposure must be made with fade-in effect.

SUMMARY OF THE INVENTION

An object of the invention is to provide a motion picture camera which embodies an automatic lap dissolve mechanism and which is more versatile than presently known cameras having automatic lap dissolve mechanisms.

Another object of the invention is to provide a motion picture camera with an automatic lap dissolve mechanism which, in addition to making of exposures first with fade-out effect and thereupon with fade-in effect, can also be used for making of exposures only with fade-out effect or exposures only with fade-in effect at the will of the operator.

An additional object of the invention is to provide an automatic lap dissolve mechanism which can be used for the making of exposures with fade-in effect or for the making of fade-out effect only.

Another object of the invention is to provide a lap dissolve mechanism whose automatic operation can be interrupted at the will of the user after a selected stage of operation.

Still another object of the invention is to provide an automatic lap dissolve mechanism wherein one or more stages of automatic operation can be omitted at the will of the user.

A further object of the invention is to provide a lap dissolve mechanism which can make a desired number of successive series of exposures with fade-out effect or with fade-in effect.

The invention is embodied in a motion picture camera which comprises an automatic lap dissove mechanism operable to repeatedly expose selected film frames in a plurality of stages including a first stage of making exposures with fade-out effect and a second stage of making exposures with fade-in effect and including at least one mobile part (e.g., a lever, a link, a gear, a shaft and/or a combination of such components) which is arranged to assume a different position at the start of each of the aforementioned stages, operating means which is actuatable (e.g., by hand) to initiate the operation of the automatic lap dissolve mechanism, and manually actuated overriding means for moving the mobile part between the aforementioned different positions to thus select the next stage or to interrupt the operation of the lap dissolve mechanism.

The overriding means enables the user of the camera to omit the stage which includes the making of exposures with fade-out effect so that the exposures which follow such adjustment are made with fade-in effect, or to prevent the lap dissolve mechanism from making exposures with fade-in effect after the completion of exposures with fade-out effect. If the user desires, the mechanism can be operated in the customary way so that it exposes a selected number of film frames with fade-out effect, that the film frames which were exposed with fade-out effect are thereupon transported rearwardly (back to a position upstream of the gate), and that the thus transported frames are exposed again but with fade-in effect.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a diagrammatic partly sectional view of a portion of a motion picture camera which embodies an automatic lap dissolve mechanism and further includes a rotary overriding element for selection of desired stages or for omission of undesired stages of operation of the lap dissolve mechanism.

DESCRIPTION OF THE PREFERRED EMBODIMENTS

The drawing illustrates a portion of a motion picture camera which includes an automatic mechanism for making exposures with lap dissolve. The mechanism is similar to that disclosed in the German printed publication No. 2,037,814 to which reference may be had if necessary.

The motion picture camera further comprises a prime mover M here shown as a reversible electric motor serving to rotate a main drive shaft 2. The latter can drive a takeup reel TR by way of a gear 9 which meshes with a gear 2a of the drive shaft 2, a second gear 9a which meshes with the gear 9, a ratchet wheel 10, and a friction clutch (not shown) which is interposed between the gear 9a and ratchet wheel 10. The takeup reel TR is assumed to be mounted in a cassette or magazine Ca of the type wherein the takeup reel can rotate only in a direction to collect the film, i.e., in a clockwise direction, as viewed in the drawing. When the camera is to make exposures with fade-out effect and to thereupon again expose those film frames which were exposed with fade-out effect (but with fade-in effect), the takeup reel TR must be arrested so that it cannot collect that length of film which is being exposed with fade-out effect (first stage of automatic operation of the lap dissolve mechanism). Such length of film is simply looped in the interior of the magazine Ca and is being fed forwardly exclusively by the customary claw pull-down, not shown. The means for automatically arresting the takeup reel TR prior to the making of exposures with fade-out effect comprises a pawl 18 which is mounted on a pivot pin 17 and is biased by a torsion spring 16 so that it normally tends to move its pallet 18a into engagement with the adjacent teeth of the ratchet wheel 10 and to thus hold the ratchet wheel (and the takeup reel TR) against rotation with the gears 2, 9, 9a. The direction of rotation of the motor M is reversed upon completion of a predetermined number of exposures with fade-out effect whereby the pull-down transports rearwardly that (looped) length of motion picture film which has been exposed with fade-out effect. The motor M is arrested in automatic response to completed rearward transport of the once-exposed film frames (such frames were exposed with fade-out effect), and the making of exposures with fade-in effect (second stage of automatic operation of the lap dissolve mechanism) begins in response to renewed actuation of the camera release, not shown. The motor M then drives the gear 9a in a clockwise direction and the pawl 18 is disengaged from the ratchet wheel 10 so that the latter can rotate the takeup reel TR which collects the twice-exposed motion picture film.

The automatic mechanism for making exposures with lap dissolve comprises a substantial number of parts which are identical with or similar to those in the motion picture camera disclosed in the aforementioned German printed publication No. 2,037,814. Such parts include a rotary two-piece programming device 1 comprising two coaxial disks 1A and 1B. The rear disk 1B is coupled to and rotates with the front disk 1A when the latter is driven to rotate clockwise, as viewed in the drawing. The disk 1A is free to move relative to the disk 1B during angular movement in a counterclockwise direction, as viewed in the drawing. Each of the disks 1A, 1B has an annulus of peripheral gear teeth (not shown) so that it can be driven by a selected gear of a train of gears 5, 6, 7, 8. The gear 6 is in permanent mesh with the gears 5, 7 and the gear 7 is further in permanent mesh with the gear 8 and is driven by a gear 4 mounted on a shaft 4a which further carries a gear 3 meshing with a gear 2b of the main drive shaft 2. Thus, the gear 3 can rotate the gear 7 in a clockwise or in a counterclockwise direction. The gears 5–8 are mounted on a holder or carrier H which can be moved in a manner to be described hereinafter so as to move the gear 5 into mesh with the front disk 1A or to move the gear 8 into mesh with the rear disk 1B of the programming device 1.

The operating means which is actuatable to start the operation of the lap dissolve mechanism includes a blocking element 11 which normally assumes the angular position shown in the drawing but can be rotated by hand (or by remote control) in the direction indicated by arrow 12 to thus allow a control member 13 of the mechanism to move downwardly, as viewed in the drawing, under the action of a helical spring 14. The control member 13 is a lever which is pivotable on and is movable lengthwise (within limits) relative to a pivot pin 13A and has an arm 13a which is engaged by the arm 18b of the pawl 18 under the action of the torsion spring 16. When the blocking element 11 assumes the illustrated position, the control member 13 is held in its upper end position whereby the arm 13a prevents the pawl 18 from pivoting in a counterclockwise direction so that the pallet 18a remains disengaged from the adjacent teeth of the ratchet wheel 10. Consequently, the takeup reel TR can rotate in a direction to collect exposed motion picture film while the gear 9a rotates in a clockwise direction, as viewed in the drawing. When the spring 14 is free to contract, the arm 13a moves downwardly and the torsion spring 16 pivots the pawl 18 counterclockwise to thus arrest the takeup reel TR by way of the ratchet wheel 10. The gears 9 and 9a continue to rotate in directions indicated by the arrows and the motor M continues to drive the aforementioned pull-down in a direction to transport the film forwardly, i.e., to draw the film off the supply reel (not shown). However, since the takeup reel TR cannot rotate in a direction to collect the film, the film is merely looped in the interior the cassette Ca downstream of the customary film gate.

The direction in which the spring 14 can move the control member 13 when the blocking element 11 is caused to turn counterclockwise is indicated by arrows 15. Such movement of the control member 13 entails a movement of the holder H so that the gear 5 moves into mesh with and begins to rotate the front disk 1A of the programming device 1. The gear 5 rotates counterclockwise, as viewed in the drawing (see the arrow 5a), so that the disk 1A rotates clockwise and entrains the rear disk 1B in the same direction through the intermediary of a suitable one-way clutch, not shown in the drawing. The rear disk 1B provided with or connected to a cam which is coupled to and can move an adjusting linkage including mobile parts 19, 20 and 21 and serving to adjust a diaphragm 23 by way of an axially movable spring-biased shaft 22 so that the diaphragm 23 gradually reduces the size of its aperture while the disks 1A and 1B rotate in a clockwise direction, i.e., the camera then makes exposures with fade-out effect. The making of such exposures is completed in automatic response to an angular displacement of the disks 1A and 1B through about 90°. A protuberance or trip 1a of the front disk 1A then actuates a lever 124 which controls a reversing switch 125 for the motor M. The motor M begins to rotate the shaft 2 in the opposite direction so that the gear 5 rotates clockwise and drives the front disk 1A in a counterclockwise direction. As mentioned before, such angular movement of the front disk 1A is not shared by the rear disk 1B so that the linkage 19, 20, 21 maintains the shaft 22 in depressed position and the diaphragm 23 remains closed to prevent entry of light during rearward transport of that length of film whose frames were exposed with fade-out effect. Such rearward transport is effected by the pull-down which is operated also while the motor M rotates in reverse. The motor circuit includes a master switch 126 which is opened by a second protuberance 1b of the front disk 1A when the latter returns to its starting position. Thus, the motor M is arrested in automatic response to completed rearward transport of that length of motion picture film whose frames were exposed with fade-out effect. The motor M is then at a standstill and can be started again (in a forward direction) when the user actuates the camera release which controls a second master switch (not shown) connected in parallel with the master switch 126. The camera release also causes the holder H to change its position so that the gear 8 moves into mesh with the rear disk 1B of the programming device 1 (the gear 8 then rotates in the direction indicated by arrow 8a) so that the rear disk 1B gradually returns to its starting position while the camera makes exposures with fade-in effect. As mentioned before, the rear disk 1B comprises or controls a cam which can transmit motion to the linkage 19-21 so that the spring-biased shaft 22 remains in abutment with a plate 21a of the part 21 while the plate 21a moves from the phantom-line position back to the solid-line position. When the making of exposures with fade-in effect is completed (namely, when the number of exposures with fade-in effect matches the number of exposures previously made with fade-out effect), the gear 8 is automatically disengaged from the rear disk 1B which then remains in its starting position until the user again decides to turn the blocking element 11 in the direction indicated by arrow 12. From there on, the size of the aperture which is defined by the diaphragm 23 is determined exclusively by the customary exposure control which preferably includes a photosensitive transducer exposed to scene light.

The pivot axis of the blocking element 11 coincides with the axis of a rotary overriding element here shown as a knob 24 which can be rotated to thereby influence the operation of the automatic lap dissolve mechanism. A projection 24a of the knob 24 can displace a motion transmitting slide 25 having slots 25b which receive stationary guide pins 25a. The slide 25 is coupled (as at 25c) with a one-armed lever 27 which is pivotable at 26 and has an end portion 27a which can displace the shaft 22 for the diaphragm 23 by way of the plate 21a on the part 21. The slide 25 is further provided with a projection 25d which can pivot the part 21 (the latter resembles a two-armed lever which is fulcrumed at 21b). A suitable spring (not shown) urges the slide 25 against the projection 24a of the overriding knob 24.

The operation of the overriding means for the automatic lap dissolve mechanism is as follows:

If the user does not wish to make exposures with fade-out effect toward the end of filming of a preceding scene but wishes to make exposures with fade-in effect at the start of filming of the next-following scene, the sequence of manipulations is as follows: The filming of the preceding scene is completed in response to termination of actuation of the customary camera release. The motor M is then arrested and the shaft 22 assumes its extended position because the rear disk 1B of the programming device 1 dwells in its starting position and its teeth are disengaged from the teeth of the gear 8. The user thereupon rotates the overriding knob 24 in a counterclockwise direction so that the slide 25 is moved in the direction indicated by arrow 28. The coupling pin 25c causes the lever 27 to pivot in a counterclockwise direction whereby the end portion 27a depresses (or causes the plate 21a to depress) the shaft 22 to thus adjust the diaphragm 23 whereby the latter reduces the size of its aperture to zero. The linkage 19-21 shares the movement of the lever 27 in a direction to depress the shaft 22 whereby the rear disk 1B of the programming device 1 rotates in a clockwise direction and assumes a position corresponding to that upon completion of the making of exposures with fade-out effect. The user thereupon rotates the blocking element 11 in the direction indicated by arrow 12 to activate the lap dissolve mechanism so that, when the camera release is actuated again, the holder H is caused to move the gear 8 into mesh with the rear disk 1B which rotates counterclockwise in response to clockwise rotation of the gear 8 (see the arrow 8a) so that the camera makes exposures with fade-in effect. As explained before, rotation of the disk 1B in a counterclockwise direction causes the linkage 19-21 to move away from the diaphragm 23 so that the shaft 22 gradually returns to the extended position which is shown in the drawing and causes or allows the diaphragm 23 to gradually increase the size of its aperture as is necessary for the making of exposures with fade-in effect. The holder H automatically disengages the gear 8 from the disk 1B when the latter reassumes its starting position whereby the making of exposures with fade-in effect is completed and, if the user continues to actuate the camera release, the camera makes normal exposures whereby the size of the aperture which is furnished by the diaphragm 23 is determined exclusively by the prevailing scene brightness and/or by one or more additional factors (such as the film speed) which normally influence an automatic exposure control for motion picture cameras.

If the user wishes to film the last portion of a preceding scene with fade-out effect and to thereupon start the filming of the next scene without fade-in effect, the procedure is as follows: Shortly prior to completion of exposures with fade-out effect, the rear disk 1B assumes a position approximately at 90° to the illustrated starting position and the projection 1a of the front disk 1A is about to actuate the reversing switch 125 by way of the lever 124 so that the direction of rotation of the motor M would be reversed and the gear 5 would return the disk 1A to the starting position whereby the projection 1b would arrest the motor M by way of the master switch 126. The adjusting shaft 22 then dwells close to or in the fully depressed position so that the size of the aperture furnished by the diaphragm 23 is zero or nearly zero. The user observes the movement of the front disk 1A and rotates the overriding knob 24 in a clockwise direction, as viewed in the drawing, before the projection 1a of the disk 1A reaches the lever 124. To this end, the front disk 1A carries or moves with an index (not shown) which moves along a scale on the housing of the motion picture camera to indicate the position of the projection 1a relative to the lever 124. Reference may be had to the copending application Ser. No. 164,302 of Albrecht filed July 20, 1971.

As the user rotates the knob 24 in a clockwise direction, the aforementioned spring causes the slide 25 to move counter to the direction indicated by the arrow 28. The projection 25d pivots the part 21 in a direction to move the plate 21a away from the diaphragm 23 so that the shaft 22 reassumes the illustrated extended position and the diaphragm 23 defines an aperture of maximum size or an aperture whose size is determined exclusively by the automatic exposure control. One frame (or possibly two or three frames) of motion picture film might be overexposed during rotation of the knob 24 in a clockwise direction. Such rotation of the knob 24 results in a return movement of disks 1A and 1B to their starting positions and the prime mover M is arrested. In the next step, the user returns the blocking element 11 to the illustrated position and the camera is ready to start the making of normal exposures in response to actuation of the camera release.

The overexposing of one or more film frames during the just described manipulation of the camera is of no consequence if the operation with fade-out involves the exposure of at least 16 frames and when the images of such frames are thereupon projected onto a screen at the usual frequency.

The rear disk 1B is coupled to the part 19 so that it returns to the starting position when the knob 24 is rotated in a clockwise direction.

The overriding knob 24 enables the user of the motion picture camera to repeatedly make exposures only with fade-out effect or only with fade-in effect. For example, the last portion of each of a series of successive filmed scenes can be made with fade-out effect or the first portion of each of a series of successive filmed scenes can be made with fade-in effect in spite of the fact that the lap dissolve mechanism is automatic, i.e., that it can and normally does cause the camera to make a number of exposures with fade-out effect and to thereupon reexpose the same frames of motion picture film but with fade-in effect. This is achieved by providing the lap dissolve mechanism with one or more mobile parts (such as the programming disk 1, the elements of the linkage 19–21 and/or the shaft 22) each of which assumes a different one of a number of positions prior to each stage of operation of the lap dissolve mechanism, and by the provision of the overriding knob 24 which enables the user to change the position of such mobile part or parts so as to avoid one or more stages of operation or to terminate the automatic operation upon completion of less than the full number of stages. The parts 25 and 27 can be said to constitute a motion transmitting connection between the overriding knob 24 and the mobile parts 21, 22 of the lap dissolve mechanism. Analogously, the parts 2, 3, 4a, 4 and 5–8 can be said to constitute a motion transmitting connection between the mobile part 1 of the lap dissolve mechanism and the prime mover M.

Without further analysis, the foregoing will so fully reveal the gist of the present invention that others can, by applying current knowledge, readily adapt it for various applications without omitting features which fairly constitute essential characteristics of the generic and specific aspects of out constrution to the art and, therefore, such adaptations should and are intended to be comprehended within the meaning and range of equivalence of the claims.

What is claimed as new and desired to be protected by Letters Patent is set forth in the appended claims:

1. In a motion picture camera, a combination comprising an adjustable diaphragm having an aperture of variable size; reversible film transporting means; a lap dissolve mechanism operable to expose motion picture film in a plurality of stages including a first stage of exposing a predetermined number of film frames with fade-out effect while said transporting means advances the film forwardly and of thereupon effecting rearward transport of said predetermined number of frames, and a second stage of exposing the rearwardly transported frames with fade-in effect while said transporting means advances the film forwardly, said mechanism comprising means for automatically reversing said transporting means in response to completion of exposures with fade-out effect and adjusting means for gradually reducing the size of said aperture from a maximum value to zero during the making of exposures with fade-out effect and for gradually increasing the size of said aperture from zero to said maximum value during the making of exposures with fade-in effect; operating means actuatable to initiate the operation of said mechanism; overriding means movable between first and second positions independently of said operating means; motion transmitting means connecting said overriding means with said adjusting means so that said adjusting means changes the aperture size to zero in response to movement of said overriding means to said first position and to said maximum value in response to movement of said overriding means to said second position; and means for rendering said reversing means ineffective in response to movement of said overriding means to said second position during the making of exposures with fade-out effect.

2. A combination as defined in claim 1, wherein said operating means is turnable about a predetermined axis and said overriding means is rotatable between said first and second positions about said axis.

3. A combination as defined in claim 1, wherein said adjusting means is reciprocable between a plurality of positions each of which corresponds to a different aperture size and said motion transmitting means comprises a lever which is pivotable by said overriding means to thereby change the position of said adjusting means.

4. A combination as defined in claim 1, wherein said means for rendering said reversing means ineffective comprises a linkage.

5. A combination as defined in claim 1, wherein said reversing means comprises an electric switch and means for normally actuating said switch in response to completion of exposures with fade-out effect, said means for actuating said switch comprising a lever which is driven by said film transporting means.

* * * * *